(12) United States Patent
Miyahara

(10) Patent No.: US 7,907,312 B2
(45) Date of Patent: Mar. 15, 2011

(54) LOCKING MECHANISM ON HINGE FIXTURE OF VERTICALLY SET IMAGE READING APPARATUS

(75) Inventor: Atsushi Miyahara, Higashikurume (JP)

(73) Assignee: Canon Kabushiki Kaisha, Tokyo (JP)

( * ) Notice: Subject to any disclaimer, the term of this patent is extended or adjusted under 35 U.S.C. 154(b) by 881 days.

(21) Appl. No.: 11/781,775

(22) Filed: Jul. 23, 2007

(65) Prior Publication Data

US 2008/0024838 A1 Jan. 31, 2008

(30) Foreign Application Priority Data

Jul. 28, 2006 (JP) .................................. 2006-205942

(51) Int. Cl.
| | |
|---|---|
| H04N 1/04 | (2006.01) |
| H04N 1/40 | (2006.01) |
| F16M 11/00 | (2006.01) |
| F16M 13/00 | (2006.01) |
| A47F 1/14 | (2006.01) |
| A47G 1/16 | (2006.01) |
| B60R 1/02 | (2006.01) |
| A47B 95/00 | (2006.01) |

(52) U.S. Cl. ........ 358/497; 358/474; 358/471; 248/407; 248/472; 248/526; 312/333

(58) Field of Classification Search .................. 248/217, 248/222, 407, 469, 478, 526, 472; 312/333
See application file for complete search history.

(56) References Cited

U.S. PATENT DOCUMENTS

| 6,311,940 B1 | 11/2001 | Koshimizu | |
|---|---|---|---|
| 2004/0084948 A1* | 5/2004 | Glynn et al. | 297/411.2 |
| 2006/0139701 A1 | 6/2006 | Kurokawa | |

FOREIGN PATENT DOCUMENTS

| JP | 2000-156756 | 6/2000 |
|---|---|---|
| JP | 2006-186771 | 7/2006 |

* cited by examiner

*Primary Examiner* — Mark K Zimmerman
*Assistant Examiner* — Fan Zhang
(74) *Attorney, Agent, or Firm* — Canon USA Inc IP Div

(57) ABSTRACT

A rotation of an original cover and a hinge member in a vertical setting state of an image reading apparatus is locked by a simple operation. A locking mechanism which fixes the hinge member to the image reading apparatus is provided. The locking mechanism is fixed in a state in which the image reading apparatus has vertically been set by using its side surface on the hinge side as a setting surface and its fixture is released in a state in which the other surface is used as a setting surface. The locking mechanism has a construction in which a movable lock member provided in the hinge engages with the lock receptacle of the image reading apparatus upon vertical setting.

3 Claims, 8 Drawing Sheets

LOCKING MECHANISM ON HINGE FIXTURE OF VERTICALLY SET IMAGE READING APPARATUS

BACKGROUND OF THE INVENTION

1. Field of the Invention

The present invention relates to an image reading apparatus for reading an original document on a transparent original plate.

2. Description of the Related Art

Hitherto, in the case of vertically setting a thin image reading apparatus, it is set by using a stand different from the image reading apparatus so that a hinge of an original cover is located almost perpendicularly to a setting surface as disclosed in Japanese Patent Application Laid-Open No. 2000-156756 (corresponding to U.S. Pat. No. 6,311,940).

As disclosed in Japanese Patent Application Laid-Open No. 2006-186771 (corresponding to U.S. Patent Application Publication No. US-2006-139701), there is an image reading apparatus in which a hinge is located almost parallel with a setting surface when the apparatus is vertically set, and the hinge is restricted by a stand built in an image reading apparatus main body so that an original document can be easily positioned upon vertical setting.

However, it is necessary to assemble the stand so that the stand can perform two kinds of functions, that is, a function for vertically setting the image reading apparatus main body and a function for restricting the hinge. Such an operation is difficult for the user to understand.

SUMMARY OF THE INVENTION

The present invention is directed to an image reading apparatus which can be easily used by the user even if it is in a vertical setting state. According to an aspect of the present invention, an image reading apparatus includes a transparent original plate; an original cover configured to cover the original plate; a hinge member configured so that a first end thereof is rotatably and axially supported to the image reading apparatus along a first rotary axis and a second end parallel with the first end is rotatably and axially supported to the original cover along a second rotary axis; and a locking mechanism operable to lock the rotation of the hinge member around the first rotary axis. In a vertical setting state in which the image reading apparatus is set by using its side surface on the hinge member side as a setting surface, the locking mechanism locks the rotation around the first rotary axis, and in the state in which the image reading apparatus is set by using the other surface as a setting surface, the locking mechanism releases the locking of the rotation.

Further features of the present invention will become apparent from the following description of exemplary embodiments with reference to the attached drawings.

DESCRIPTION OF THE EMBODIMENT

Figure 1:
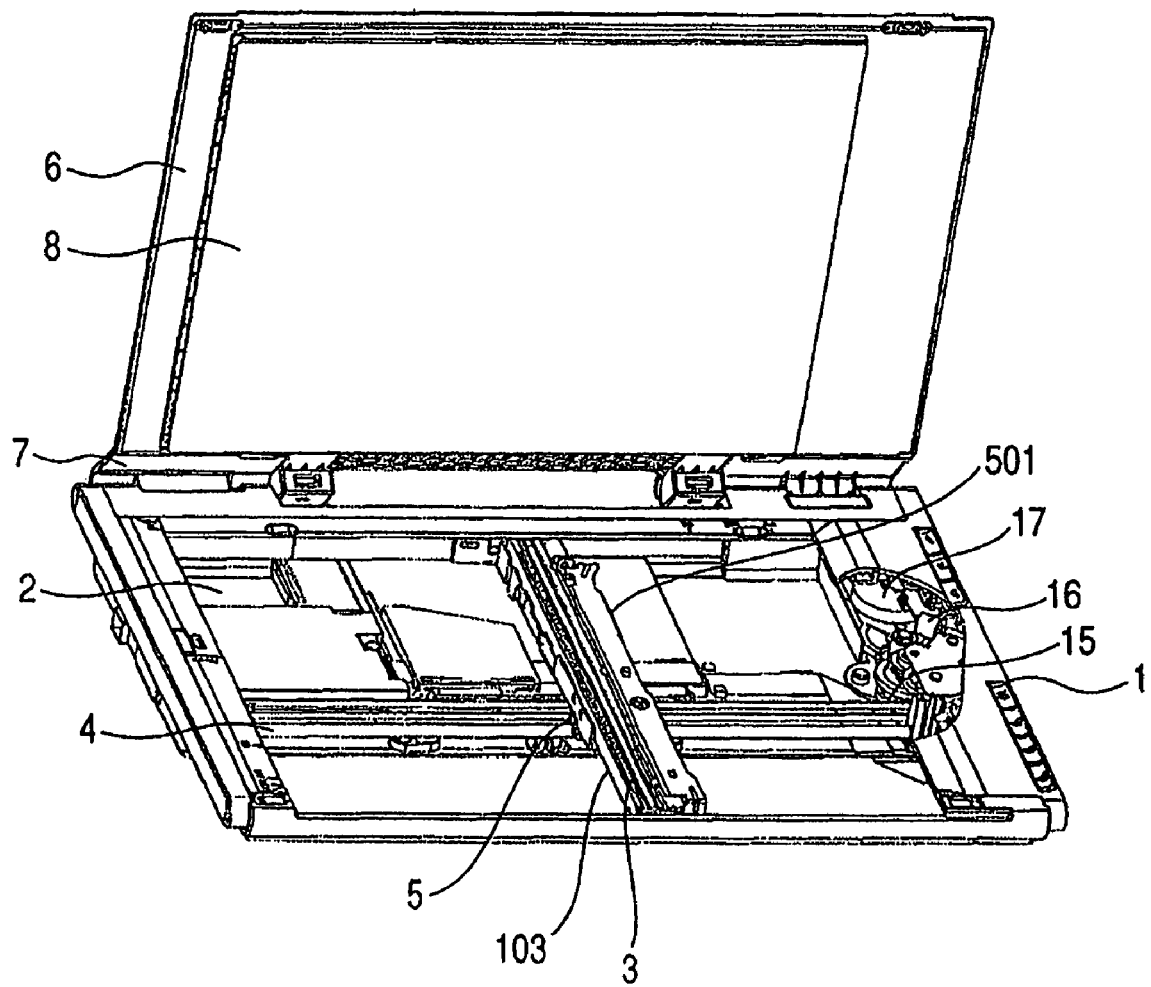
FIG. 1 is a perspective view of an image reading apparatus according to an embodiment of the present invention in a state where an original cover has been opened.

FIG. 1 is a perspective view of a color image reading apparatus according to an embodiment of the present invention. As illustrated in FIG. 1, an original (or image document) is set onto an original plate glass 2 serving as a transparent original plate attached to an upper surface of an apparatus main body 1. An image formed on the original is read by scanning a contact image sensor 3 in parallel with the original plate glass 2.

LEDs for three colors of RGB serving as light sources for irradiating the original, a rod lens array for forming reflection light from the original as an image onto photosensitive elements of an image sensor, and the image sensor are built in the contact image sensor 3. The light sources of three colors are sequentially switched and turned on, and the image sensor reads the reflection light from every color of the original, thereby executing the color separation reading operation.

The contact image sensor 3 is axially supported to a sensor holder 103 in a state where spacers made of a material with high slidability are respectively arranged in right and left edge portions. The sensor holder 103 is fixedly supported onto a slider 5 which slides on a guide shaft 4 fixed to the apparatus main body 1. The left edge portion of the contact image sensor 3 is pressed against the original plate glass 2 through the spacer by a spring positioned onto the sensor holder 103. A unit including the sensor 3, the sensor holder 103, the spring, and others integrated with the slider 5 is called a carriage 501 hereinbelow. As illustrated in FIG. 1, a belt 15 for transferring a motive power from a motor serving as a scan driving source is fixed to the slider 5. By the forward/reverse rotation of the motor, the carriage 501 can reciprocatively scan in a range of the original plate glass 2. One end of a flexible cable (not shown) to input and output an electric signal of the sensor 3 is connected to the sensor 3, and the other opposite end of the cable is connected to a control board of the image reading apparatus main body.

The belt 15 for transferring the motive power from the motor serving as a scan driving source is fixed to the slider 5.

By the forward/reverse rotation of the motor, the contact image sensor 3 can reciprocatively scan in the range of the original plate glass 2.

Besides the above component elements, the image reading apparatus has electric/electronic parts including the control board and a power source. They are arranged in the apparatus main body 1 which fixedly supports the original plate glass 2.

Figure 2A:
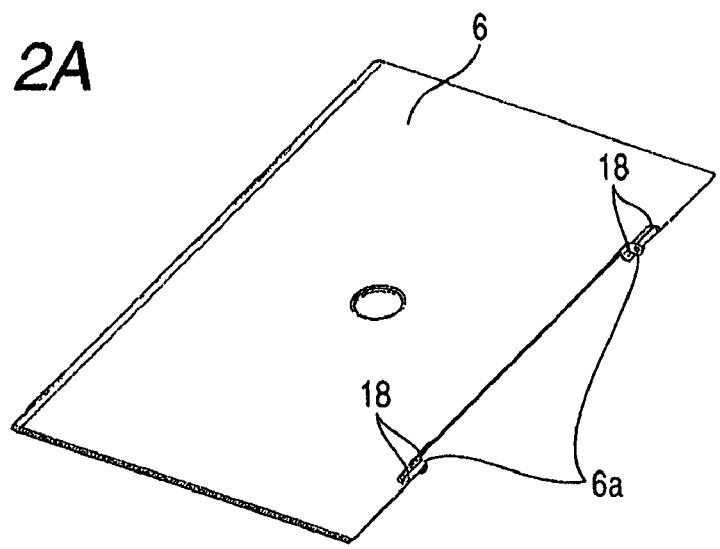
FIG. 2A is a perspective view of the single original cover of the image reading apparatus according to the embodiment of the present invention.
Figure 2B:
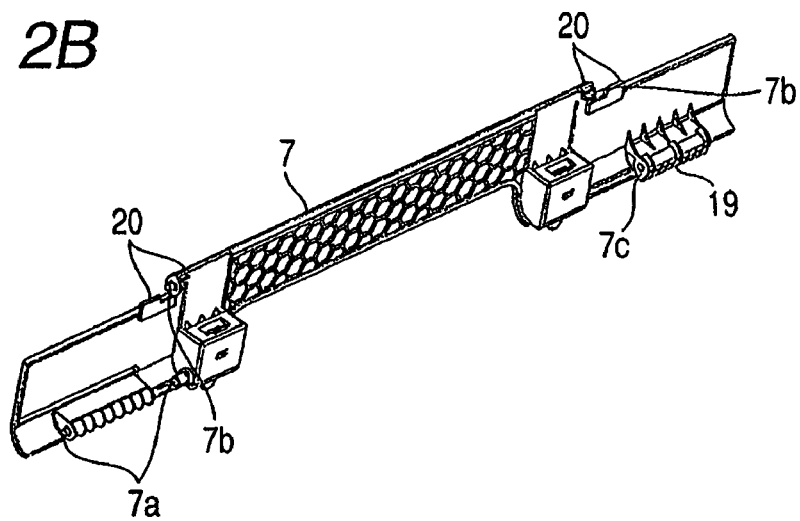
FIG. 2B is a perspective view of a single hinge plate.
Figure 2C:
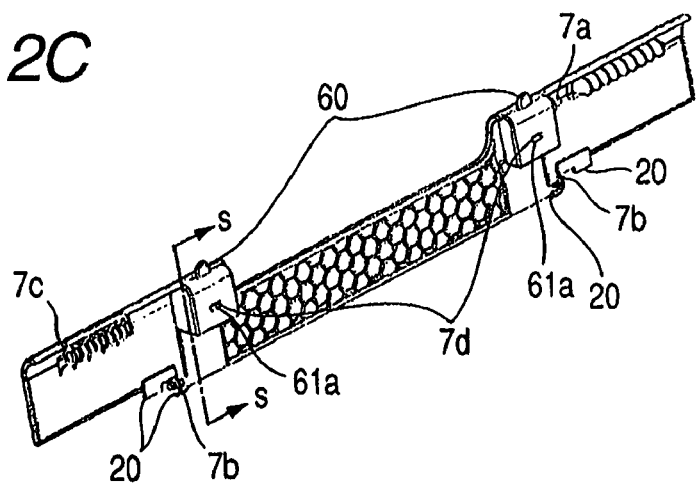
FIG. 2C is a perspective view of the single hinge plate when seen from another direction.
Figure 3A:
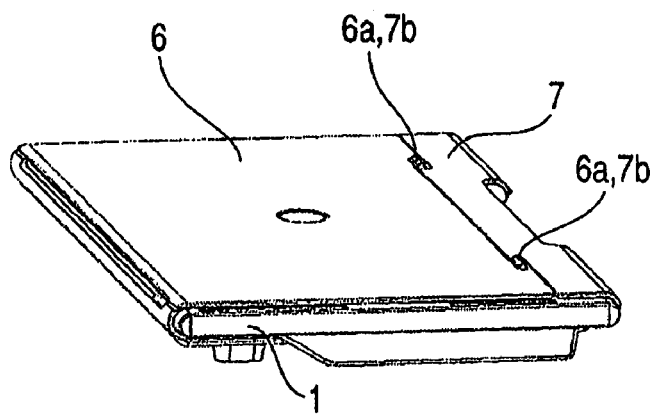
FIG. 3A is a perspective view of the image reading apparatus according to the embodiment of the present invention in a state where the original cover has been closed.
Figure 3B:
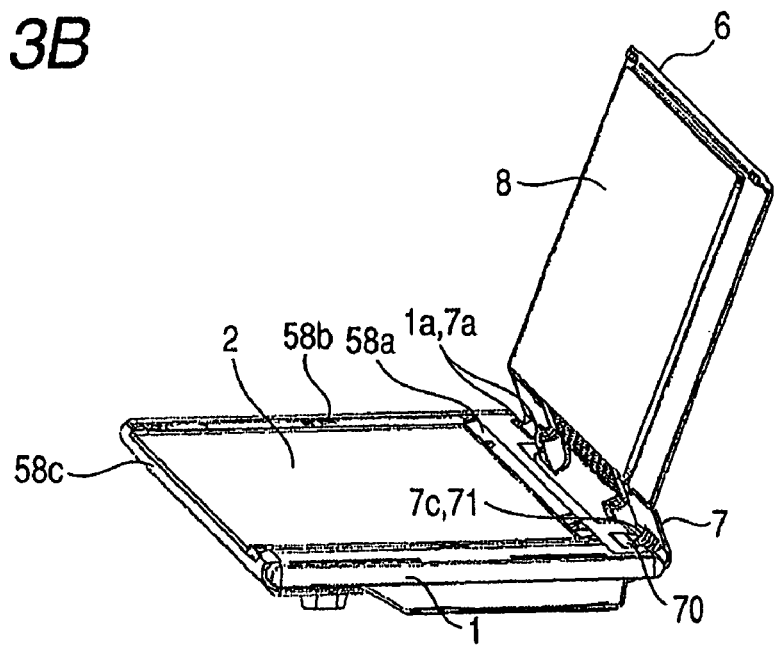
FIG. 3B is a perspective view of the image reading apparatus in a state where the original cover has been opened by 110°.

An opening/closing construction of an original cover 6 for the apparatus main body 1 will now be described. FIGS. 2A to 2C are explanatory diagrams of a construction of a hinge for closably coupling the original cover 6 with the apparatus main body 1. FIG. 3A is an explanatory diagram of a state where the original cover 6 has been closed, FIG. 3B is an explanatory diagram of a state where the original cover 6 has been opened by about 110°, and FIG. 3C is an explanatory diagram of a state where the original cover 6 is in parallel with the original plate glass 2 and a hinge plate 7 has been opened by about 70°.

As illustrated in FIGS. 2A to 2C, 3A to 3C, and 5, a shaft 71 for the hinge and a concave portion (or recess) 1*a* are coaxially provided at a rear edge portion of the apparatus main body 1. A hole portion 7*c* of the hinge plate 7 is rotatably and axially supported to the shaft 71 for the hinge. A convex portion (or projection) 7*a* of a rear edge of the hinge plate is rotatably and axially supported to the concave portion 1*a*. The reason why the shaft 71 for the hinge is provided for one side is because when the original cover 6 is opened, the whole load of the hinge plate 7 and the original cover 6 is applied to this portion. Further, convex portions 7*b* are provided for the hinge plate 7 at two positions in parallel with the convex portion 7*a* and the hole portion 7*c*, respectively. Concave portions (or recesses) 6*a* of the original cover 6 are rotatably and axially supported, respectively. Thus, the original cover 6 is closably attached to the apparatus main body 1 around axes at two positions as fulcrums. Projecting portions 18 for locking the rotation are provided on the original cover 6, and projecting portions 20 for locking the rotation are provided on the hinge plate 7, respectively.

Figure 3C:
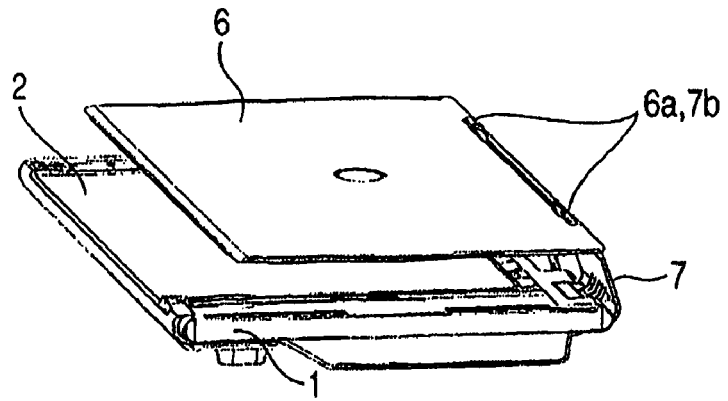
FIG. 3C is a perspective view of the image reading apparatus in a state where only the hinge plate has been opened by 70°.

When a thick original document such as a book is set and the original cover 6 is closed, as illustrated in FIG. 3C, positions of the original cover 6 and the hinge plate 7 are determined at balanced positions according to a height of the thick original document. At this time, the hinge plate 7 is rotated according to a thickness of the thick original document, thereby enabling the thick original document to be pressed.

Figure 5:
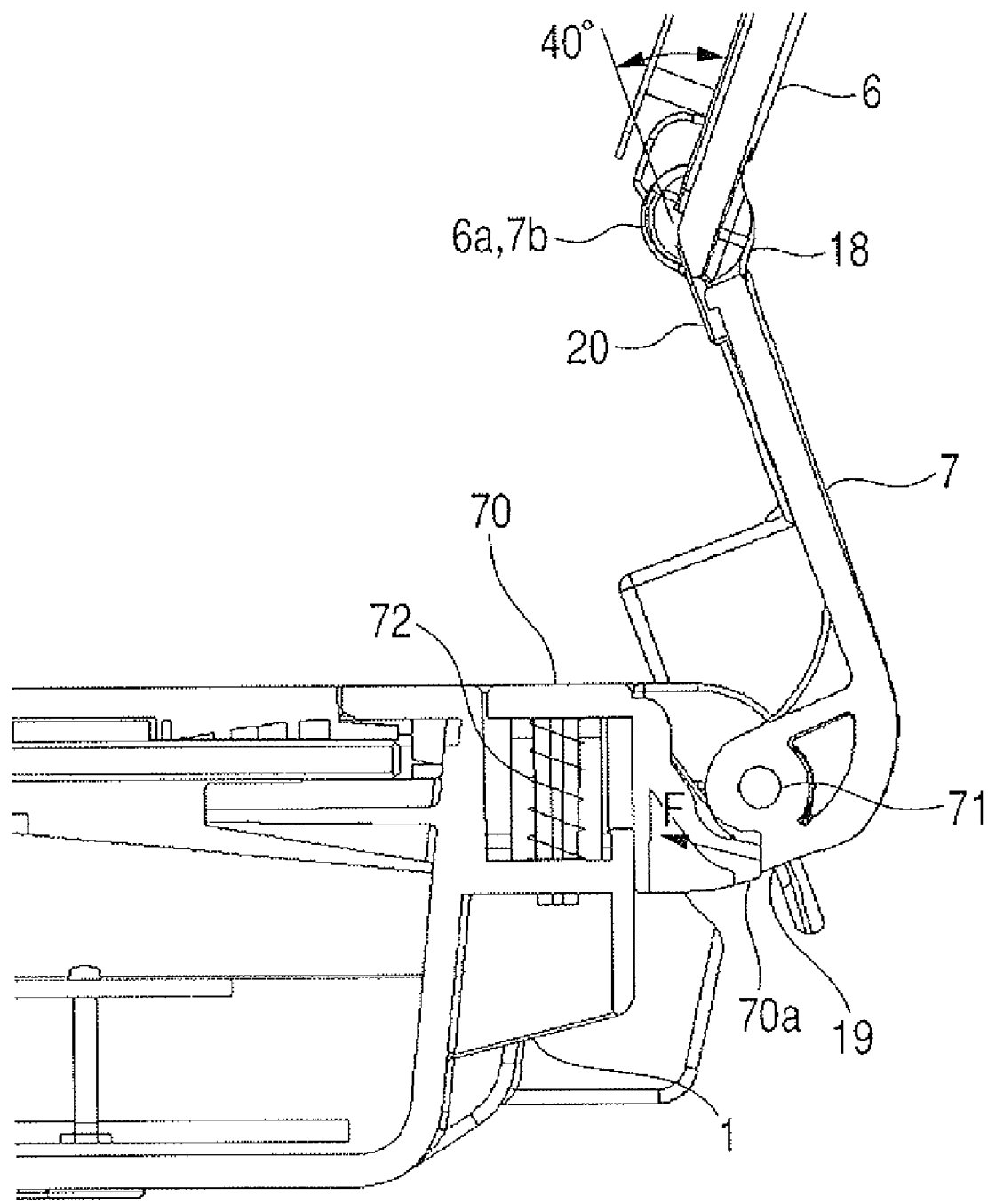
FIG. 5 is a detailed cross sectional view in a state where the original cover of the image reading apparatus according to the embodiment of the present invention has been opened by 110°.

When the original cover 6 is ordinarily opened, first, only the original cover 6 starts to be opened around the axially supporting portions 6*a* and 7*b* as rotational centers, respectively. After that, a rotational angle of the original cover 6 is stopped at a position where it is opened by about 40° in relation to the hinge plate 7 by the rotation locking projecting portions 18 and 20 provided on the original cover 6 and the hinge plate 7. Even if the user intends to further open the original cover, the original cover 6 is not opened by an angle over 40° in relation to the hinge plate 7. Therefore, as illustrated in FIG. 5, while maintaining the angle of about 40°, the hinge plate 7 is rotated around the shaft 71 for the hinge as a rotational axis. At a position where the hinge plate 7 is opened by about 70° for the original plate glass 2, a contacting portion 19 of the hinge plate 7 comes into contact with a contacting member 70*a*. Since the open position of the original cover 6 is maintained at this position, the user can set the original with the hand removed from the original cover 6.

A construction of a locking mechanism for fixing the hinge plate 7 so as not to be opened when the image reading apparatus is vertically set will now be described.

Figure 6A:
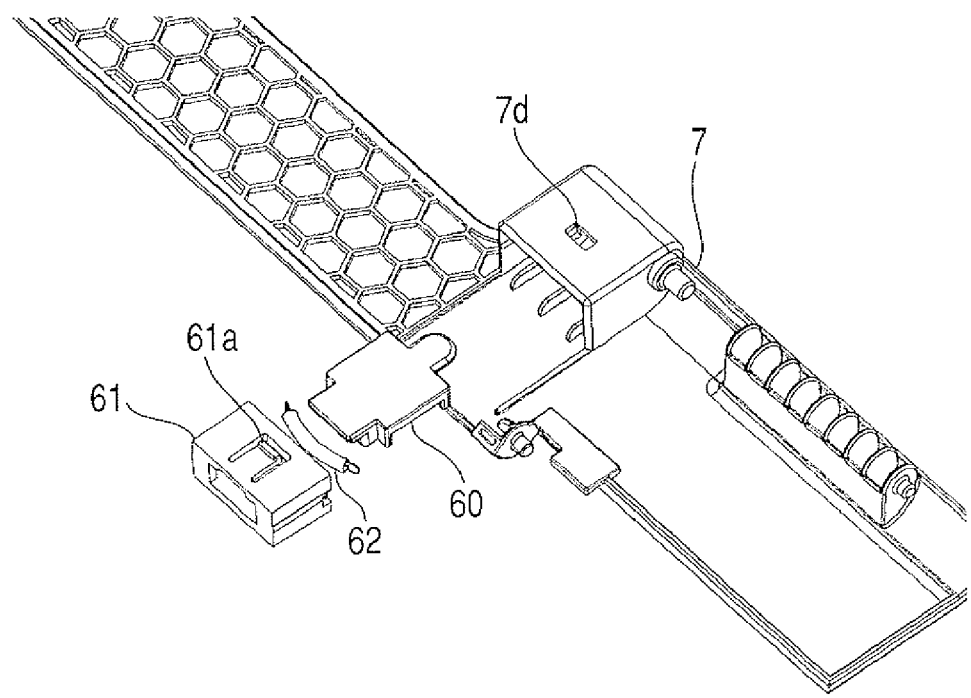
FIG. 6A is an exploded diagram of the hinge plate of the image reading apparatus according to the embodiment of the present invention.

First, the hinge plate side will be described. As illustrated in FIG. 6A, two lock members 60, two springs 62, and two lock cases 61 are assembled in the hinge plate 7, respectively.

Figure 6B:
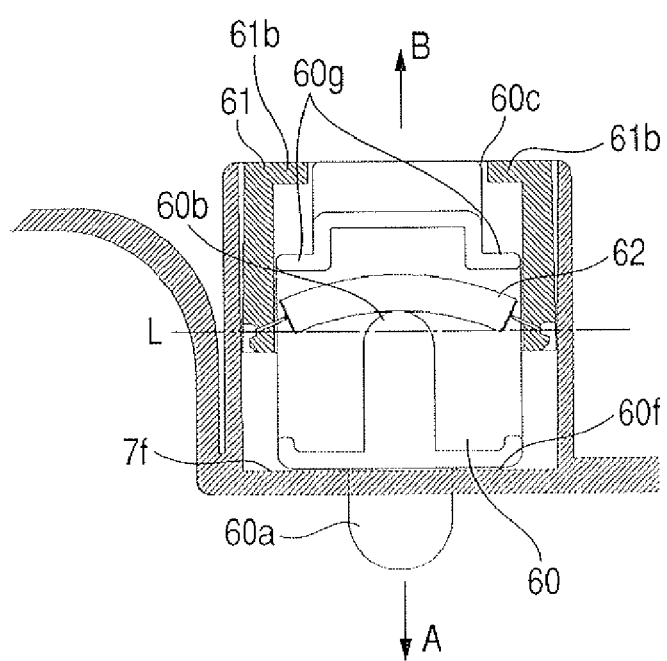
FIG. 6B is a cross sectional view of the hinge plate.

FIG. 6B is a cross sectional view of FIG. 2C in a state where the lock members 60, the springs 62, and the lock cases 61 have been assembled in the hinge plate 7, respectively. The lock member 60 is inserted into the lock case 61. Since the lock case 61 is fixed to the hinge plate 7, the lock member 60 can move between an inner wall 7*f* of the hinge plate and an inner wall 61*b* of the lock case 61 in the upper/lower direction on the paper surface, that is, only in the direction which is parallel with a rotary axis of the hinge coupling the convex portion 7*a* with the hole portion 7*c*.

The spring 62 is attached to the lock case 61. A restoring force of this spring acts so that its axis is overlaid onto an axis L. According to the lock member 60, since a projecting portion 60*b* is in contact with the spring 62 and is projected to an upper portion of the paper surface than the axis L, the lock member 60 is always pressed to the inner wall 7*f* side by the restoring force of the spring 62. By pushing a projecting portion 60*a* in the direction shown by an arrow B, the lock member 60 moves until a flange 60*g* comes into contact with the inner wall 61*b* of the lock member 60. However, when the pushing operation is stopped, the lock member 60 moves in the direction shown by an arrow A until the flange 60*g* comes into contact with the inner wall 7*f* by the restoring force of the spring 62.

Figure 7A:
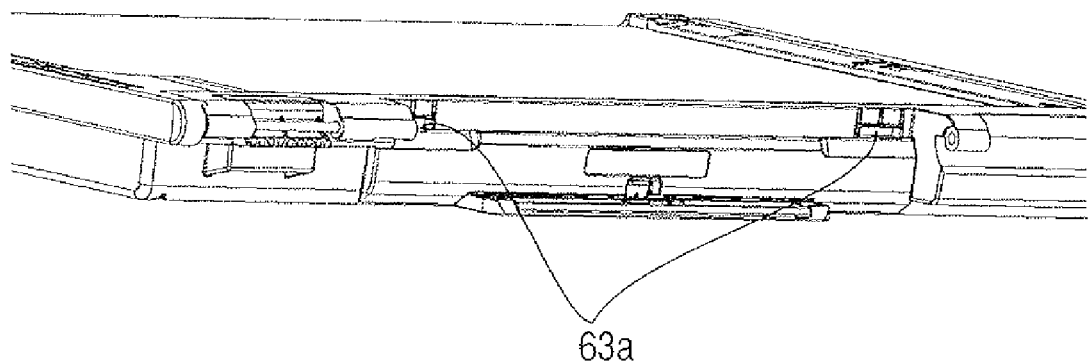
FIG. 7A is a rear view of the image reading apparatus according to the embodiment of the present invention in a state where the original cover and the hinge plate have been removed from the image reading apparatus.
Figure 7B:
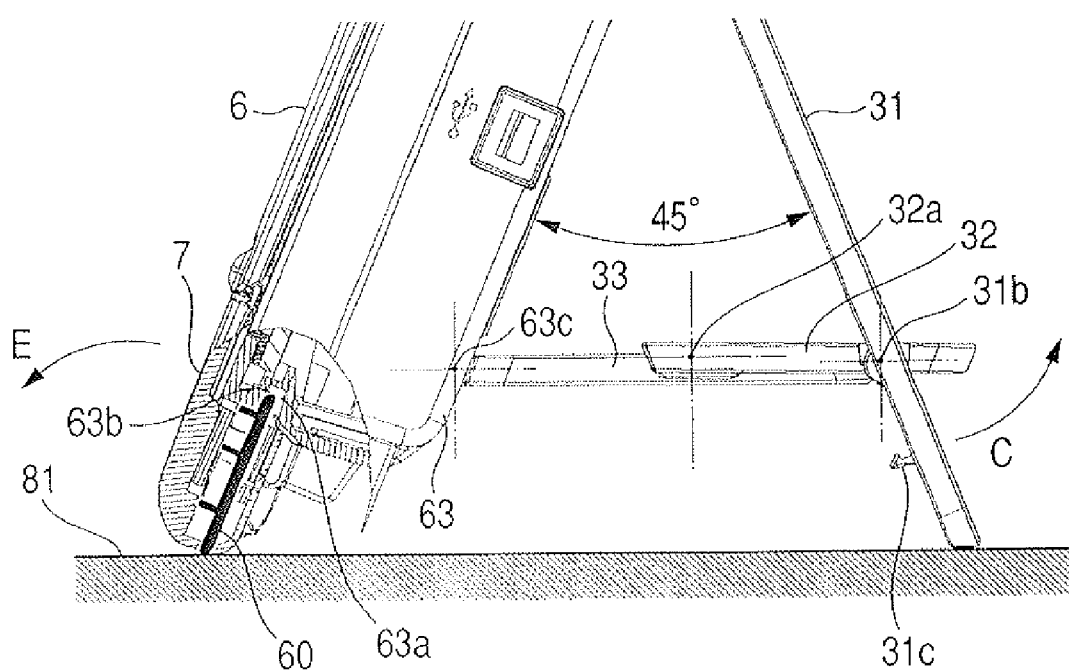
FIG. 7B is a cross sectional view of a locking mechanism of the hinge plate in the vertical setting state.

As illustrated in FIGS. 7A and 7B, a lock receptacle 63*a* is provided in a frame body 63 of the image reading apparatus. When the hinge plate 7 is closed, a projecting portion 60*c* of the lock member 60 can be inserted into the lock receptacle 63*a* in a state where the lock member 60 has been inserted in a state where the lock member 60 comes into contact with a wall 61a of the lock case 61. The lock receptacle 63*a* is constructed in such a manner that a wall surface 63*b* of the lock receptacle 63*a* on the frame body comes into contact with the lock member 60 in a state where the lock member 60 has been inserted. That is, in the state where the lock member 60 has been inserted into the lock receptacle 63*a*, even if the user intends to rotate the hinge plate 7 in the direction shown by an arrow E in FIG. 7B, since the lock receptacle 63*a* is in contact with the wall surface 63*b*, the hinge plate 7 cannot be rotated but is held in a closing state.

Figure 4A:
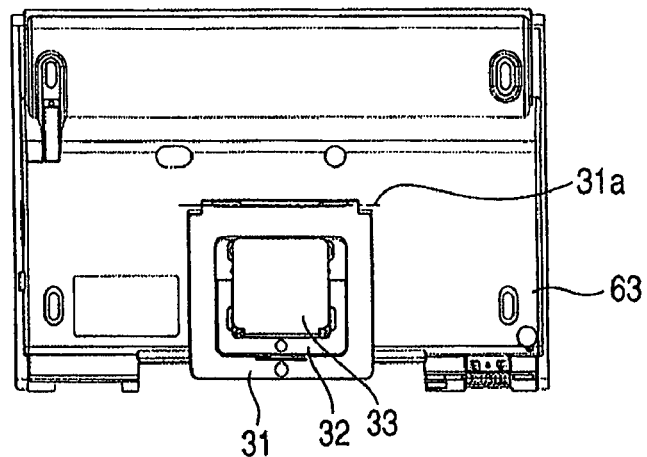
FIGS. 4A, 4B and 4C are diagrams in the case of vertically setting the image reading apparatus according to the embodiment of the present invention.
Figure 4B:
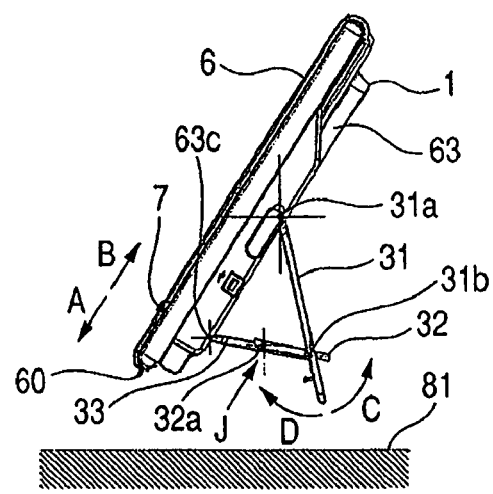
Figure 4C:
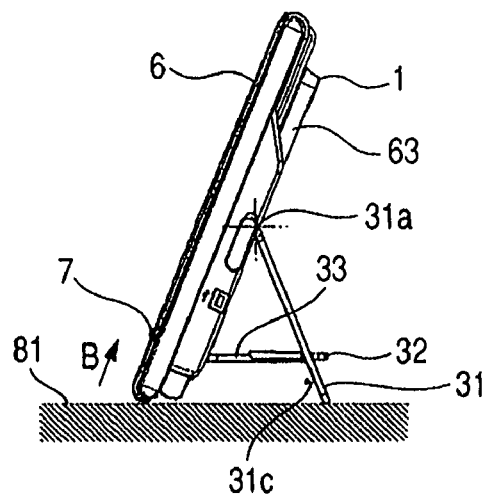

As illustrated in FIGS. 4A to 4C, a stand 31 which is fixed onto the frame body and rotatable around an axis 31*a* as a rotational center is attached. The stand 31 is connected to a member 32 having two parallel rotary axes so as to be rotatable around an axis 31*b*. A member 33 also has two parallel rotary axes. One end of the member 33 is connected to the frame body 63 so as to be rotatable around an axis 63*c* and the other opposite end is connected to the member 32 as to be rotatable around an axis 32*a*. The stand 31 is opened in the direction shown by an arrow C in FIG. 4B. When the stand 31 is opened to an angle of 45°, the axes 63*c*, 32*a*, and 31*b* are aligned on one straight line and the axes 31*b* and 63*c* become the longest. Since the members 32 and 33 are mutually locked by a locking mechanism (not shown), the stand 31 is fixed to the main body and the apparatus can be vertically set. When the stand 31 is folded, the rotary axis 32*a* is pushed in the direction shown by an arrow J in FIG. 4B, thereby rotating the stand 31 in the direction shown by an arrow D. When the stand 31 is enclosed into the main body, it is fixed to the frame body 63 by a projection 31*c* on the stand 31 as illustrated in FIG. 4A.

Subsequently, the case of actually using the image reading apparatus in the vertical setting state will be described. As illustrated in FIG. 4B, first, the image reading apparatus 1 is lifted up from a setting surface 81 in a state where the original cover 6 has been closed (0°) and the stand 31 is rotated in the C direction to the angle of 45°. Subsequently, as illustrated in FIG. 4C, the image reading apparatus is set onto the setting surface 81 so that the rotary axes 7a and 7c of the hinge plate 7 are located to the lower side. In this instance, the projecting portion 60a of the lock member 60 comes into contact with the setting surface 81. Although the lock member 60 is pressed in the A direction in FIG. 4B by the spring 62 as mentioned above, since the force in the B direction that is caused by the self-weight is larger than the pressing force, the lock member 60 moves in the B direction until the flange 60g comes into contact with the inner wall 61b. At this time, the projecting portion 60c of the lock member 60 is inserted into the lock receptacle 63a, thereby locking the rotation of the hinge plate. In such a vertical setting state, the original plate glass 2 is arranged at an angle of 110° in relation to the setting surface 81. The original cover 6 can be opened by up to 40° in relation to the original plate glass 2 as mentioned above. In this state, a receiving port of the original which is formed by the original plate glass 2 and the original cover 6 faces up at an open angle of 40°.

Figure 8:
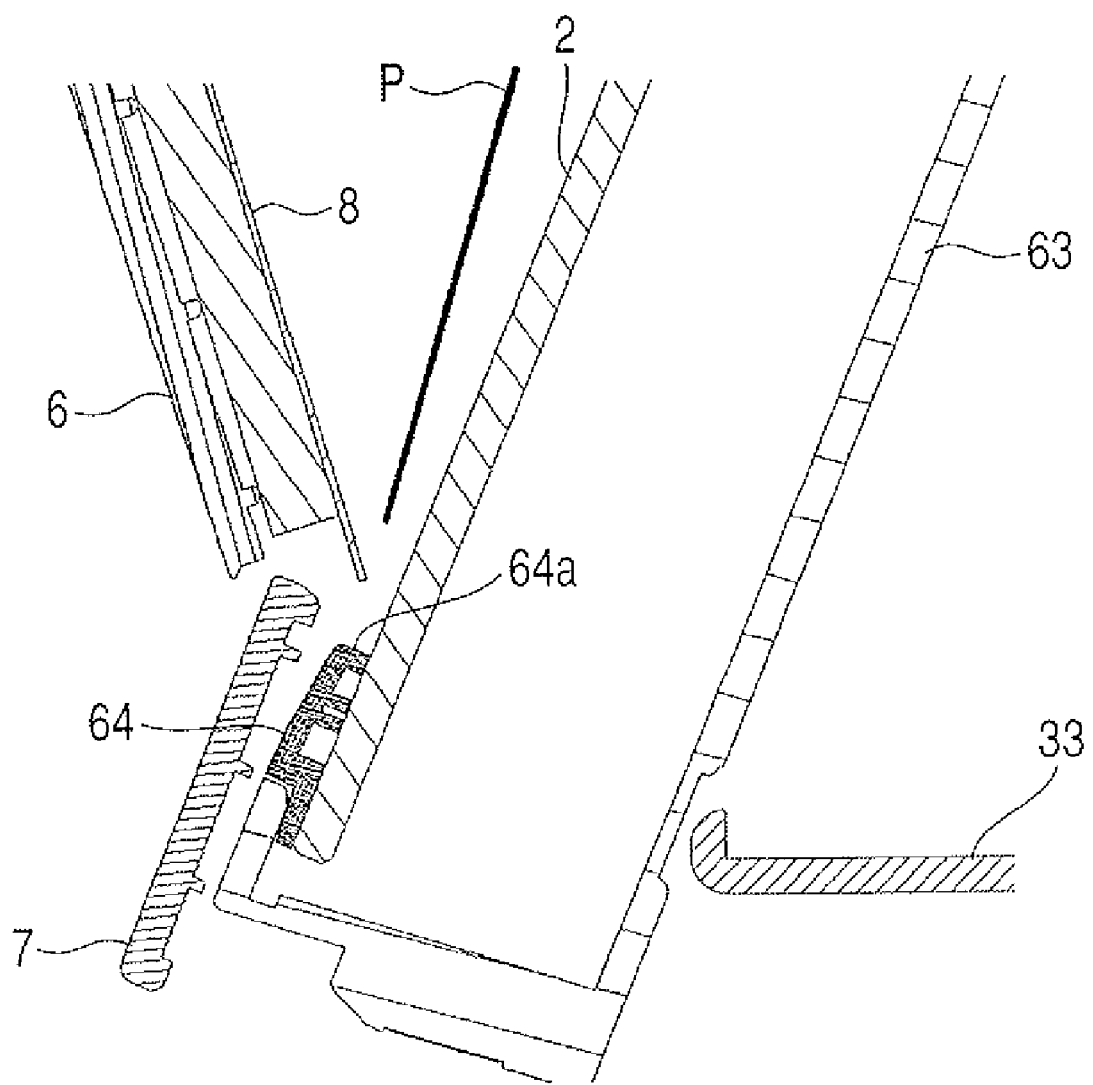
FIG. 8 is an original setting diagram upon vertical setting of the image reading apparatus according to the embodiment of the present invention.

As illustrated in FIG. 8, as a setting method of the original P in the vertical setting state, the original cover 6 is opened and the original P is inserted between the original plate glass 2 and a pressure adhesion sheet 8. A member 64 is provided on the original plate glass 2 at an original contacting (or hitting) reference position. The original P comes into contact with a wall 64a of the member 64. At this time, the pressure adhesion sheet 8 is oriented at an angle of 40° in relation to the original plate glass and can guide the original P so that the original P can certainly come into contact with the wall 64a. In this instance, even if the user removes the original P from the hand during the setting operation of the original, since the wall 64a has a sufficient height, it can receive the dropping original P. If the original cover 6 is opened too wide in relation to the original plate glass 2, the original remains on the pressure sheet 8 and does not reach the wall 64a. On the contrary, if the original cover 6 is opened slightly, it is difficult to arrange the original into the opening. Therefore, the open angle between the original plate glass 2 and the original cover 6 should lie within a range of (40±10)°.

When the image reading apparatus is returned from the vertical setting state to the ordinary lateral setting state, first, the image reading apparatus is lifted up from the setting surface. At this time, the lock member 60 moves in the A direction until the flange 60g comes into contact with the inner wall surface 7f by the restoring force of the spring 62. In a state where it has come into contact with the inner wall surface 7f, the hinge plate 7 is pulled out of the lock receptacle 63a on the frame body and is rotatable. After that, the stand is rotated in the D direction and enclosed into the main body, and the image reading apparatus is laterally set.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-205942, filed Jul. 28, 2006, which is hereby incorporated by reference herein in its entirety.

What is claimed is:

1. An image reading apparatus comprising:
   a transparent original plate (2);
   an original cover (6) configured to cover the original plate;
   a hinge member configured so that a first end (7) thereof is rotatably and axially supported to the image reading apparatus along a first rotary axis and a second end parallel with the first end is rotatably and axially supported to the original cover along a second rotary axis;
   a locking mechanism operable to lock the rotation of the hinge member around the first rotary axis,
   wherein in a vertical setting state in which the image reading apparatus is set by using its side surface on the hinge member side as a setting surface, the locking mechanism locks the rotation around the first rotary axis, and in the state in which the image reading apparatus is set by using the other surface as a setting surface, the locking mechanism releases the locking of the rotation,
   wherein in the vertical setting state, the locking mechanism locks the rotation by a self-weight of the image reading apparatus, and in a state other than the vertical setting state, the locking mechanism releases the locking of the rotation,
   wherein the locking mechanism includes a lock member attached to the hinge member so as to be movable between a locking position and a releasing position, and a lock receptacle,
   wherein in the state other than the vertical setting state, the lock member is in the releasing position, an edge portion of the lock member is projected from the side surface on the hinge member side, and an engagement between the other edge portion of the lock member and the lock receptacle is released, and
   wherein in the vertical setting state, the lock member is in the locking position, the edge portion of the lock member is pushed into the hinge member, and the other edge portion of the lock member engages with the lock receptacle; and
   a spring member, wherein the spring member urges the lock member in such a direction so as to release the engagement.

2. The apparatus according to claim 1, wherein the locking mechanism locks the rotation so as to close the hinge member in relation to the image reading apparatus.

3. The apparatus according to claim 2, further comprising a restricting mechanism configured to restrict an angle at which the original cover rotates around the second rotary axis in relation to the hinge member.

* * * * *